United States Patent
Zhang et al.

(10) Patent No.: US 6,246,721 B1
(45) Date of Patent: Jun. 12, 2001

(54) TERMINATION STRUCTURE BASED ON THE CANCELLATION OF THE REFLECTED WAVE

(75) Inventors: Johnny Q. Zhang; David B. Hollenbeck, both of Ft. Collins, CO (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 08/935,012

(22) Filed: Sep. 22, 1997

(51) Int. Cl.[7] .............................. H04B 3/00; H03K 11/16; H03K 5/22
(52) U.S. Cl. ............................ 375/257; 327/247; 327/67
(58) Field of Search ........................... 375/257; 327/247, 327/67, 379

(56) References Cited

U.S. PATENT DOCUMENTS

| | | | |
|---|---|---|---|
| 5,276,415 | * 1/1994 | Lewandowski et al. | 333/260 |
| 5,495,186 | * 2/1996 | Kanazawa et al. | 326/83 |
| 5,784,126 | * 7/1998 | Boccacio | 348/708 |
| 5,828,241 | * 10/1998 | Sukegawa | 327/67 |

* cited by examiner

Primary Examiner—Chi Pham
Assistant Examiner—Khai Tran
(74) Attorney, Agent, or Firm—Alexander J. Neudeck

(57) ABSTRACT

A termination structure is shown whereby multiple transmission lines designed to have the same intrinsic impedance and same delay are driven from a central node. The central node is driven by a driver and calibration resistor connected in series to produce a drive impedance that is equal to the parallel combination of the intrinsic impedances of the multiple transmission lines. At the other end of the multiple transmission lines is a receiver and a feedback circuit. The feedback circuit provides a modest amount of positive feedback from the output of the receiver to the input of the receiver. This positive feedback prevents the output of the receiver from being affected by small reflections and perturbations that result from mismatches among the multiple transmission lines.

10 Claims, 1 Drawing Sheet

TERMINATION STRUCTURE BASED ON THE CANCELLATION OF THE REFLECTED WAVE

BACKGROUND OF THE INVENTION

1. Field of the Invention

This invention relates generally to electronic circuits, and more particularly to circuits for the transmission of digital signals. Even more particularly, this invention relates to a scheme for terminating a clock network.

2. Background of the Invention

Modern digital electronic devices, such as computers, often have many different components that receive the same timing reference or clock signal. This makes communication between these components much simpler. One common clock distribution topology, used to reduce clock skew, and reduce cost, involves driving multiple transmission lines of equal length with a single device. At the end of each of these transmission lines is a receiving device, and a termination impedance. The termination impedance is matched to the intrinsic impedance of the transmission line to prevent, or reduce, reflections off the end of the transmission lines. This, in turn, reduces the amount of noise on a signal allowing the designer to specify smaller noise margins. Smaller noise margins allow signals to switch faster, improving the overall speed of the electronic device.

Unfortunately, this termination scheme suffers from several problems. First, each termination impedance at the end of a transmission line increases the DC current the driver must supply. This increases the power drawn by the electronic device. For example, if there are five 50 Ω terminations connected between ground and the end of five transmission lines, the driver must supply 100 milliamps to maintain the signal at 1 volt above ground. For a clock signal with a 50% duty cycle, the driver would draw an average of 50 milliwatts. In contrast, if each of the transmission lines has a 100 picosecond delay, and is unterminated, the driver would only draw an average of 330 microwatt for a 33 megahertz clock signal.

Another problem is the termination impedance. For each receiving device, a termination impedance is needed. To ensure reflections are minimized, this impedance must be calibrated against process variations to closely match the intrinsic impedance of the transmission line. That means that for five receiving devices, five calibration circuits must be built, or five passive impedances must be laser trimmed. This increases the cost of building the electronic device.

Accordingly, there is a need in the art for an improved termination scheme for clock networks that does not draw significant DC current. This scheme should minimize the number of devices that need to be matched, or calibrated. Furthermore, this scheme should be tolerant of moderate variations in the length of the transmission lines delivering the clock signal. These needs, and others, are met by the present invention.

SUMMARY OF THE INVENTION

An electrical network according to the present invention consists of multiple components each connected to a single signal source in a star arrangement. The signal source is connected at the central hub of the star arrangement. Each component is connected to the central hub of the star arrangement via a transmission line. Each of the transmission lines connecting the components to the central hub has the same delay between the component and the hub. The signal source is supplied by a driver device in series with a source termination resistor. The combined impedance of the source termination resistor, and the driver is matched to the parallel combination of the intrinsic impedances of the transmission lines. This causes the waves reflected off the end of each transmission line to meet at the hub at approximately the same instant in time, and have approximately the same magnitude. Because the reflected waves arrive at the same time, and have the same magnitude, but are all traveling towards the hub, they cancel each other out as they arrive at the hub instead of continuing to propagate down, or reflect off of, the other transmission lines connected to the hub. Each component receives the signal from a transmission line through a receiver. The output of the receiver is fed back to the input of the receiver to clamp minor reflections, and to help hold the signal at a constant voltage in the presence of noise.

DETAILED DESCRIPTION

Figure 1:
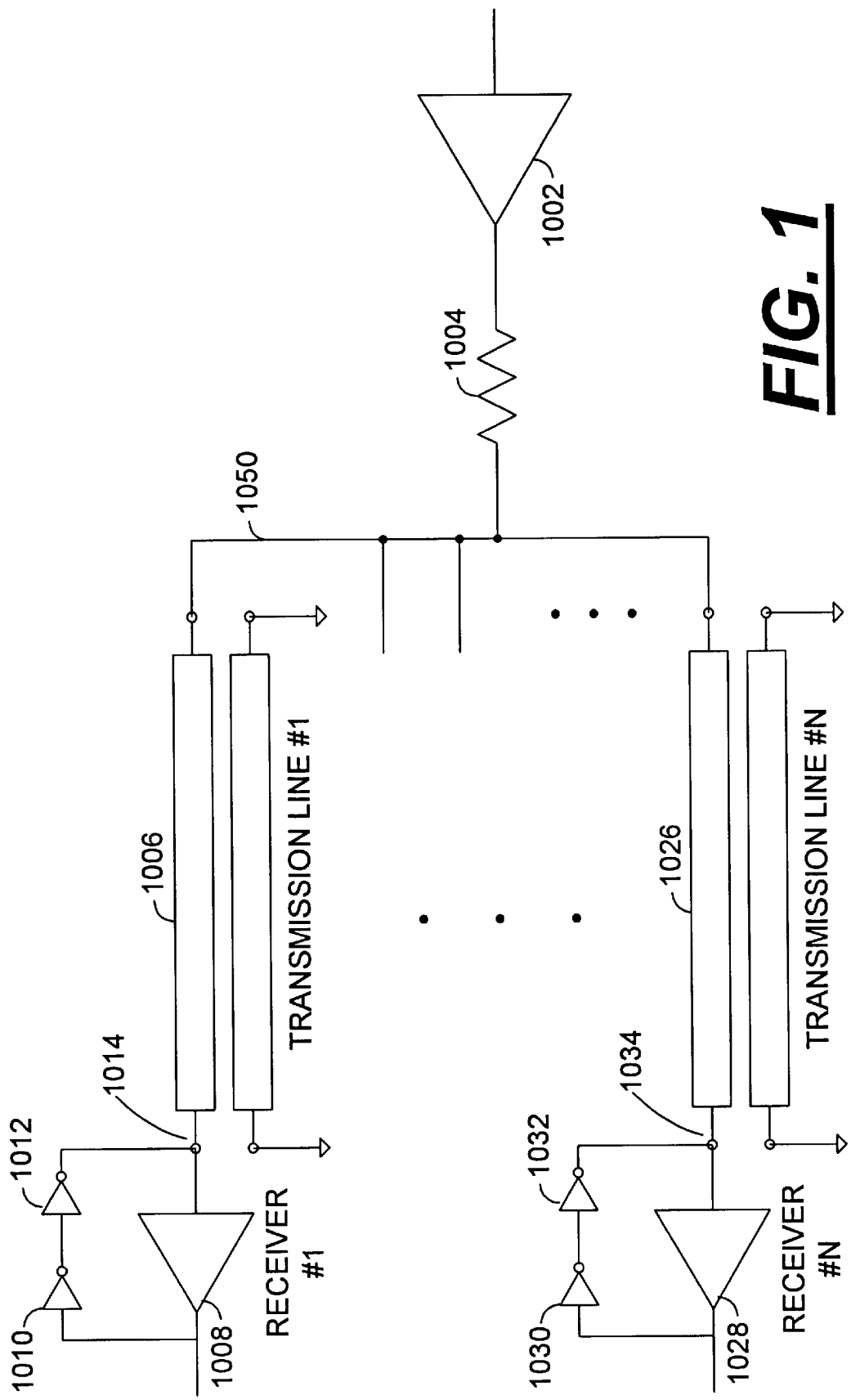
FIG. 1 show an illustrative schematic of an electrical network with the termination scheme of the present invention.

FIG. 1 shows an illustrative schematic of a signal being distributed to, and received by, N number of components. Driver 1002 is the source of the signal. Driver 1002 may be part of a VLSI integrated circuit, a dedicated driver integrated circuit, or a clock oscillator. Source termination resistor 1004 is connected between the output of driver 1002 and hub node 1050. Hub node 1050 is connected to N number of transmission lines represented by transmission lines 1006 and 1026. Each of these N transmission lines connects hub node 1050 to at least one component. The nodes at the end of the transmission line opposite the hub node are represented by nodes 1014 and 1034. These nodes connect to the components receiving the signal. The receiver circuits in each component are represented by receivers 1008 and 1028 that have their inputs connected to nodes 1014 and 1034, respectively.

Two inverters 1010, 1012, connected in series, feed the output of receiver 1008 back to node 1014. The input to inverter 1010 is connected to the output of receiver 1008. The output of inverter 1010 is connected to the input of inverter 1012. The output of inverter 1012 is connected to the input of receiver 1008, which is node 1014. Likewise, two inverters 1030, 1032, connected in series, feed the output of receiver 1028 back to node 1034. The input to inverter 1030 is connected to the output of receiver 1028. The output of inverter 1030 is connected to the input of inverter 1032. The output of inverter 1032 is connected to the input of receiver 1028, which is node 1034.

The feedback provided by the inverters at each component serves to hold the input of the receiver against minor reflections caused by mismatches in the transmissions lines. Normally, all the transmission lines leading from the hub node 1050 to each component would be designed to have the same delay and intrinsic impedance. However, some mismatch in these parameters may occur due to process variations during fabrication. These mismatches can cause small reflections and perturbations to occur at the output of the transmission lines 1014, 1034. The feedback inverters 1010, 1012 and 1030, 1032 prevent these reflections and perturbations from affecting the output of receivers 1008 and 1028 by absorbing some, or all, of the energy in these small reflections and perturbations.

Inverters 1012 and 1032 should be constructed to have enough drive strength to absorb all the energy in the small reflections, yet be over driven by a legitimate transition on hub node 1050. Also, if the receiver 1008 or 1028 has an inverting output, only one inverter will be needed to create the feedback necessary to hold the input of the receiver.

The value of termination resistor 1004 should be chosen so that the sum of it, and the impedance of driver 1002 matches the impedance of the intrinsic impedances of all the transmission lines in parallel. If there are N transmission lines, each with an intrinsic impedance of $Z_0$ then the sum of resistor 1004 and the impedance of driver 1002 should be $Z_0/N$.

The above description is included to illustrate the preferred embodiments. It is not meant to limit the scope of the invention. The scope of the invention is to be limited only by the following claims. From the above discussion, many variations will be apparent to one skilled in the art that would yet be encompassed by the spirit and scope of the invention.

We claim:

1. A circuit for distributing a signal, comprising:
   a first component, said component having a first receiver and a first feedback circuit, wherein said first receiver has a first receiver output and a first receiver input, and wherein said first feedback circuit provides positive feedback from said first receiver output to said first receiver input;
   a second component, said component having a second receiver and a second feedback circuit, wherein said second receiver has a second receiver output and a second receiver input, and wherein said second feedback circuit provides positive feedback from said second receiver output to said second receiver input;
   a hub node;
   a first transmission line, said first transmission line connecting said hub node to said first receiver input;
   a second transmission line, said second transmission line connecting said hub node to said second receiver input;
   a driver, said driver having a driver impedance and a driver output;
   a resistor, said resistor having a resistor impedance wherein said resistor connects said driver output to said hub node.

2. The circuit of claim 1, wherein said first transmission line has a first intrinsic delay and said second transmission line has a second intrinsic delay and said first intrinsic delay and said second intrinsic delay are approximately equal.

3. The circuit of claim 2, wherein said first transmission line has a first intrinsic impedance and said second transmission line has a second intrinsic impedance and said first intrinsic impedance and said second intrinsic impedance are approximately equal.

4. A circuit for distributing a signal, comprising:
   a plurality of N components, wherein N is an integer greater than one, and wherein each of said plurality of N components has a receiver and a feedback circuit, and wherein said receiver has a receiver output and a receiver input, and wherein said feedback circuit provides positive feedback from said receiver output to said receiver input;
   a hub node;
   a plurality of N transmission lines, each of said plurality of N transmission lines connects said hub node to one of said receiver inputs;
   a driver, said driver having a driver impedance and a driver output;
   a resistor, said resistor having a resistor impedance wherein said resistor connects said driver output to said hub node.

5. The circuit of claim 4, wherein each of said plurality of N transmission lines has an intrinsic delay and each of said plurality of N transmission lines has an intrinsic delay that is approximately equal to said intrinsic delay of every other of said plurality of said N transmission lines.

6. The circuit of claim 5, wherein each of said plurality of N transmission lines has an intrinsic impedance and each of said plurality of N transmission lines has an intrinsic impedance that is approximately equal to said intrinsic impedance of every other of said plurality of said N transmission lines.

7. The circuit of claim 5, wherein each of said plurality of N transmission lines has an intrinsic impedance and the sum of said resistor impedance and said driver impedance is approximately equal to the parallel impedance combination of each said intrinsic impedance of each of said plurality of N transmission lines.

8. The circuit of claim 6, wherein each of said plurality of N transmission lines has an intrinsic impedance that is approximately equal to said intrinsic impedance of every other of said plurality of said N transmission lines, and wherein the sum of said resistor impedance and said driver impedance is approximately equal to said intrinsic impedance divided by N.

9. A method of terminating a plurality of N transmission lines having equal delay and equal intrinsic impedance, where N is an integer greater than one and each of said plurality of N transmission lines has a first end and a second end, comprising the steps of:
   connecting said first end of each of said plurality of N transmission lines to a hub node;
   connecting said second end of each of said plurality of N transmission lines to one of a plurality of N components, wherein each of said plurality of N components has a receiver and a feedback circuit, and wherein said receiver has a receiver output and a receiver input, and wherein said feedback circuit provides positive feedback from said receiver output to said receiver input;
   driving said hub node with a drive impedance that is approximately equal to said intrinsic impedance divided by N.

10. The method of claim 9, wherein said drive impedance is controlled by a resistor.

* * * * *